(12) United States Patent
Gordon

(10) Patent No.: US 6,489,945 B1
(45) Date of Patent: Dec. 3, 2002

(54) METHOD AND SYSTEM FOR TRACKING ATTITUDE

(75) Inventor: Gary B. Gordon, Saratoga, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 18 days.

(21) Appl. No.: 09/691,318

(22) Filed: Oct. 18, 2000

Related U.S. Application Data (63) Continuation of application No. 09/022,097, filed on Feb. 11, 1998, now Pat. No. 6,175,357.

(51) Int. Cl.⁷ .................................................. G09G 5/08
(52) U.S. Cl. ........................ 345/158; 345/856; 348/340
(58) Field of Search .................................. 345/158, 145, 345/157, 160; 250/200, 201.1, 216, 227.1, 239; 348/335, 340, 374, 294

(56) References Cited

U.S. PATENT DOCUMENTS

| | | | | |
|---|---|---|---|---|
| 5,504,319 A | * | 4/1996 | Li et al. ...................... | 235/462 |
| 5,510,603 A | * | 4/1996 | Hess et al. ................... | 235/454 |
| 6,003,773 A | * | 10/1996 | Durbin et al. .............. | 235/462.45 |
| 5,576,529 A | * | 11/1996 | Koenck et al. .............. | 235/472 |
| 5,837,987 A | * | 11/1998 | Koenck et al. .............. | 235/462 |
| 6,285,400 B1 | * | 9/2001 | Hokari ....................... | 348/374 |

\* cited by examiner

*Primary Examiner*—Richard Hjerpe
*Assistant Examiner*—Ronald Laneau (57) ABSTRACT

A method and system for tracking attitude of a device includes fixing a two-dimensional array of photosensors to the device and using the array to form a reference frame and a sample frame of images. The fields of view of the sample and reference frames largely overlap, so that there are common imaged features from frame to frame. Sample frames are correlated with the reference frame to detect differences in location of the common features. Based upon detection of correlations of features, an attitudinal signal indicative of pitch, yaw, and/or roll is generated. In the preferred embodiment, the attitudinal signal is used to manipulate a screen cursor of a display system, such as a remote interactive video system (RIVS). However, attitudinal tracking using the invention may be employed in other applications. Another aspect of the invention is that the two-dimensional array is configured to compensate for any curvilinear distortions introduced by a lens system for imaging the features within the field of view of the array.

4 Claims, 8 Drawing Sheets

METHOD AND SYSTEM FOR TRACKING ATTITUDE

CROSS REFERENCE TO RELATED APPLICATION(S)

This is a continuation of copending application Ser. No. 09/022,097 filed on Feb. 11, 1998 now Pat. No. 6,175,357.

TECHNICAL FIELD

The invention relates generally to methods and systems for tracking attitude of a device and more particularly to tracking the attitude of a device in order to control a device or process, such as a cursor of a video display.

BACKGROUND ART

There are applications in which video systems require that a person interact with information presented on a display screen. At times, the interaction is to occur while the person is situated at a distance from the display screen. As will be described more fully below, the interaction may be accomplished by remotely controlling a screen cursor in one of a variety of manners. The interactions may include selecting from a variety of choices presented as a screen menu, or "typing" text using an on-screen keyboard. Examples of remote interactive video systems (RIVS) include interactive television (ITV), TV-style Internet browsers, and conference-room video projectors.

One key component of a RIVS is the "pointing" device for controlling the on-screen cursor. The pointing device fulfills a function analogous to that which mice, trackballs, and graphic tablets perform for computers. However, the environment for RIVS presents difficulties that are typically not encountered in operation of a computer. For example, an operator of a RIVS is typically further away from the controlled device than is the operator of a computer. As another example, the operator of a RIVS is more likely to be in an unstructured immediate environment, e.g., an ITV operator seated across a living room from a television set. In many situations, the environment precludes use of conventional computer pointing devices, such as mice. Moreover, a RIVS is rarely equipped with a keyboard, so that the pointing device may have to accommodate the extra burden of providing a text entry.

There are a number of known pointing devices for a RIVS. Most of the known pointing devices implement some variation of a four-key cursor pad on a hand-held controller. The four-key cursor pad is manipulated to step the screen cursor up, down, left or right among various menu choices. Such interfaces emulate the computer keyboard cursor keys used with old-style textural interfaces. However, these interfaces are typically much slower and less intuitive to use than computer mice and other pointing devices developed for modern graphical software interfaces.

In an effort to improve upon cursor control within the RIVS environment, more advanced computer pointing devices of mice and trackballs have been adapted. In one adaptation, a miniature trackball is mounted atop a controller, with the trackball being operated by the person's thumb. The trackball controller is faster than the use of cursor keys and facilitates diagonal moves. Unfortunately, the trackball may require repeated strokes to accomplish large cursor movements and, in general, thumb control taxes the user's thumb dexterity. For example, it is difficult to trace the cursor in a circle on the display screen.

The use of a mouse for ITV cursor control has been demonstrated. The advantage of the mouse is that it provides excellent and intuitive cursor control. The concern is that there may not be a suitable planar operating surface that is convenient to the operator.

A further refinement in the RIVS pointing art is the use of devices that enable control of a cursor by merely gesturing with a controller. These devices may measure the attitude, i.e. pitch, yaw, and possibly roll, of the controller. A first category of such an approach employs light beams to measure attitude. PCT International Publication Number WO 95/19031 describes a system for determining the pointing orientation of a remote unit relative to a fixed base unit. The fixed base unit includes one or more light sources for emitting a light beam. The emitted light is polarized in at least one predetermined orientation. The movable remote unit includes a photodetector for detecting the polarized emitted light. The attitude of the movable remote unit may be determined by measuring the intensity of received light from various directions.

Another implementation of the emitted-light category of measuring attitude is one in which an infrared (IR) signal is beamed from the area of the video display. The IR signal is defocused and is imaged onto a quad photodiode array in the controller. The relative signal amplitudes from the four photodiodes may be used to determine the relative orientation of the controller to a line drawn from the display. One concern is that the system may undesirably flood the room with intense IR, rendering other nearby IR-coupled appliances (e.g., a VCR controller) inoperative. A second concern is that the limited range of transmission of defocused IR signals may render this system of measuring attitude unreliable when the controller is more than a relatively short distance from the video display.

A second category of devices that measure attitude of the controller is one in which inertial navigation principles are employed. Gyroscopes or encoded gimballed masses establish inertial frames in the controllers, against which attitude changes can be measured. The attitude information may then be transmitted to the video display via a radio-frequency link to a small dipole antenna affixed atop the video display.

The third category is related to the first category. A hand-held object that provides cursor control has a number of light sources mounted on one surface. A single electronic camera is directed to capture images of the light sources mounted on a hand-held object. Locations of the images of the light sources are detected in each camera image, and a computer is used to determine the attitude of the light-emitting hand-held object. Such a device is described in U.S. Pat. No. 5,338,059 to DeMenphon.

A closely related need exists in the field of virtual reality. In games, simulations, and other visualization situations, it is often necessary to encode the attitude of a user's head, or other body part. In many cases, systems for encoding head pitch and yaw may be applied to RIVS controllers, and vice versa. One known virtual reality system encodes pitch and yaw by means of instrumented compasses and gravimeters.

While the known cursor control devices and attitude-determining systems operate adequately for their intended purposes, each is associated with a concern or a problem. Operation may be slow or tedious, or may require use of a specific operating surface. Devices and systems that include IR radiation may adversely affect operation of other devices. Attitude-sensing devices that are based on gravity may have difficulty in distinguishing tilting from transverse acceleration, thereby rendering control erratic. This last problem conceivably could be solved by gyro stabilization, but the cost and power consumption make this solution unattractive. Known systems that utilize light detection require adding a second contrivance at the display, again adding additional cost.

What is needed is a method and a system for reliably tracking attitude of a device. What is further needed is such a method and system that is cost efficient when used in controlling a screen cursor or when used in other remote interactive video applications.

SUMMARY OF THE INVENTION

Correlation of successive images acquired by means of a two-dimensional array of photosensors is used as a basis for tracking attitude of a device to which the array is affixed. In the preferred embodiment, the device is a hand-holdable member, such as a controller for maneuvering a cursor on a display screen of a video set. Based upon the step of correlating images to detect differences in location of imaged features that are common to a succession of images, the system generates an attitudinal signal indicative of any changes in angular orientation during the time period of acquiring the images. That is, the attitudinal signal is determined by the pitch and yaw, and optionally the roll, of the device that bears the array of photosensors. Since the acquired images need not be related to that which is being controlled, e.g. a screen cursor, the device can face in any direction during the control process. Moreover, it is not necessary to provide a dimensional one-to-one correspondence of angular displacement of the device and travel of that which is being controlled. Within cursor control, for example, the controller may be directed arbitrarily and relationships of degrees of pitch and yaw to lengths of cursor movement may be user-adjustable.

The two-dimensional array of photosensors is used to acquire a reference frame for tracking the attitude of the device. The reference frame is stored and a second image of features within a field of view of the array is acquired. The second image may be considered to be a sample image, and the fields of view of the two images should be largely overlapping, so that the reference and sample frames include a number of common features. While not critical, the device includes optics which provide a focus nominally at infinity, intentionally presenting an off-sharp image to the array of photosensors. In the application of the device for controlling a screen cursor, the representative imaged features will typically include windows, lamps, furniture and the display screen itself. In any application of the invention, one or more stationary sources of light may be specifically added within the environment to be imaged, so that successive images of the fixed light are used for the purpose of correlation. In one implementation of such an embodiment, the source of light is an IR emitter and the imaging array on the device is provided with IR filtering to permit tracking of the attitude of the device.

Conceptually, the step of correlating the reference frame with a sample frame is one in which one of the frames is fixed in position and the other frame is repeatedly shifted to determine which shifted position best approximates an alignment of the imaged features that are common to the two frames, thereby allowing the determination of the pitch and yaw of the imaging array during the interval between acquiring the two frames. In practice, the shifts are performed computationally and are shifts of pixel values in which each pixel value is indicative of light energy received at a particular photosensor at a specific time. The correlations may be limited to computational shifts of only one pixel for nearest-neighbor correlations, or may be multi-pixel computational shifts. The nearest-neighbor correlation process is often preferred, since it is less computationally complex, with only the original position and eight computational shifts being necessary. Interpolations are then performed to determine angular displacements that are less than a full pixel. Angular displacement of the device about a horizontal axis, i.e. pitch, will result in the arrangement of pixel values of the reference frame being moved upwardly or downwardly. Angular displacement of the device about a vertical axis, i.e. yaw, will result in the pixel value arrangement being moved to the left or to the right. The system detects pitch, yaw and combinations of pitch and yaw. The attitudinal signal that is generated by the system is responsive to the detection of such angular displacements. Optionally, roll may also be considered.

In the application in which the attitudinal signal is generated in order to control a screen cursor, the device preferably includes a transmitter for wireless transmission of a cursor-control signal. For example, the signal may be transmitted via an infrared beam. Changes in the pitch of the hand-holdable device are then translated into vertical movements of the screen cursor, while changes in device yaw will move the screen cursor laterally. In this embodiment, translational movement of the device may also be detected and utilized, so that vertical or horizontal movement of the device translates to a corresponding vertical or horizontal movement of the screen cursor.

One concern in the implementation of the method and system is the effect of the phenomena known in the lens design as curvilinear distortions. Curvilinear distortions are also referred to as pin-cushion, barrel, and perspective distortions. Rectilinear detail is compressed at the outer edges of the field by such distortion. Curvilinear distortion is particularly pronounced in simple lenses with wide fields of view, such as the lens contemplated for use with the present invention. In the invention, the field of view is preferably approximately 64°, so that curvilinear distortions will inevitably occur.

In the preferred embodiment, the photosensors of the array vary dimensionally in order to define an array that is curvilinear, i.e., includes an arcuate outer edge. The curvilinear array is dimensioned to compensate for the curvilinear distortion introduced by the lens system. The imaging by the optics is evaluated to characterize the curvilinear distortion, with the array then being patterned to offset the distortion. In this manner, the arrangement of the photosensor array and the optics greatly reduces adverse effects of curvilinear distortion.

An advantage of the invention is that device attitude may be tracked in a reliable and cost-efficient manner. For those applications in which the array-bearing device is a hand-holdable device, control of a screen cursor or the like is economically achieved without a premium on dexterity. Moreover, the device does not require operation on a suitable surface.

BEST MODE FOR CARRYING OUT THE INVENTION

Figure 1:
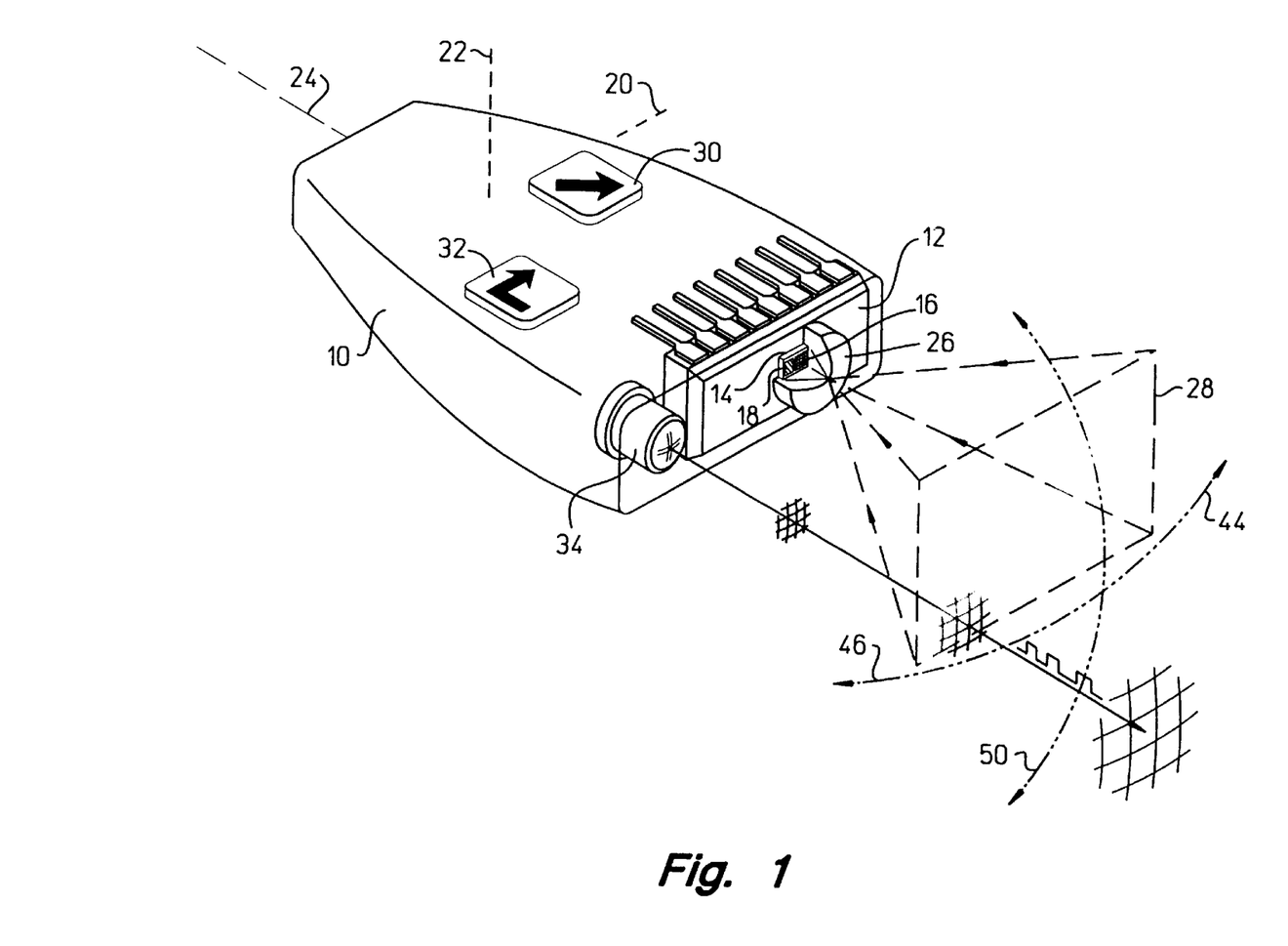
FIG. 1 is a perspective view of a hand-holdable device that enables attitude tracking of the device, in accordance with the invention.

With reference to FIG. 1, a hand-holdable controller device 10 is shown as including an integrated circuit package 12 for acquiring and processing image data. On the surface of the package is an optoelectric integrated circuit chip 14 having a two-dimensional array 16 of photosensors and having processing circuitry 18. The array and processing circuitry are used to acquire successive frames of image data, permitting the attitude of the device to be tracked. Thus, angular displacement about a horizontal axis 20, i.e. pitch, and angular displacement about a vertical axis 22, i.e. yaw, can be determined. Optionally, roll about the longitudinal axis 24 of the device 10 can also be monitored.

The invention will be described primarily with reference to providing control of a remote element, such as controlling a screen cursor of a video display. However, it is understood that the approach of tracking attitude by means of correlating images formed by a photosensor array attached to the device has applications beyond that of controlling a screen cursor or the like.

The sensor array 16 and the processing circuitry 18 are mounted on the front of the controller device 10 with the array facing outwardly. A lens 26 is shown in FIG. 1 as being partially cutaway in order to expose the array and circuitry. The lens may be an inexpensive plastic lens that is molded to the integrated circuit package 12. The focus of the lens is set nominally at infinity. The lens provides an image of a region of the surrounding environment to the sensor array 16. A short focal-length lens is preferred, since a greater number of features within the environment will be imaged and used for the purpose of tracking attitude. The image quality demands are sufficiently lax, such that the demands on the optical arrangement are not stringent. In fact, a slight blurring is desirable, so that the spatial frequencies of the image are coarser than the size of the array elements.

The width of the field of view for imaging the environment is a matter of balancing the desire of capturing as much visible detail as possible with the requirement of avoiding excessive distortion. A 64° field of view provides a reasonable compromise between these two concerns. The dashed lines 28 in FIG. 1 represent the field of view for the sensor array 16. The arrangement of the optics and the sensor array may be selected to reduce any adverse effects of curvilinear distortion on the attitude-tracking approach of the invention. The optic/sensor arrangement will be described in greater detail below.

On the top surface of the controller device 10 are a cursor control key 30 and a return key 32. In operation, the screen cursor of a video display may be captured by depression of the control key 30. With the control key in a depressed position, the angular displacement of the device 10 will be translated into movement of the cursor along the display screen. For example, in selecting a particular movie from a menu of movies presented by an interactive television system, key 30 is depressed and pitch and/or yaw of the device 10 is employed to drag the screen cursor to the desired movie. The control key 30 is then released to release control of the screen cursor. With the cursor indicating the desired menu choice, the return key 32 is depressed to activate the selection. Alternatively, a single selection key similar in operation to that of a computer mouse may be utilized, so that cursor control is continuously enabled.

Remote communication is provided by infrared transmission via an emitter 34. Infrared emission is well known in the art. For cursor control, signal vectors are generated and transmitted. The vectors are sent as increments in order to reduce the burden of the IR communications channel by keeping the data bytes shorter. The rate at which vectors are transmitted should be sufficiently fast to achieve the necessary cursor responsiveness, but not so fast as to tax the limited bandwidth of the IR link to the controlled set. As will be explained more fully below, in one embodiment the transmission is a 10-bit word that is emitted every 40 ms, as needed. When neither of the keys 30 and 32 is depressed, no transmission occurs. This frees the IR emitter for other functions during non-cursor events. Thus, the controller device 10 may include keys to control other events, such as the changing of a television channel.

Figure 2:
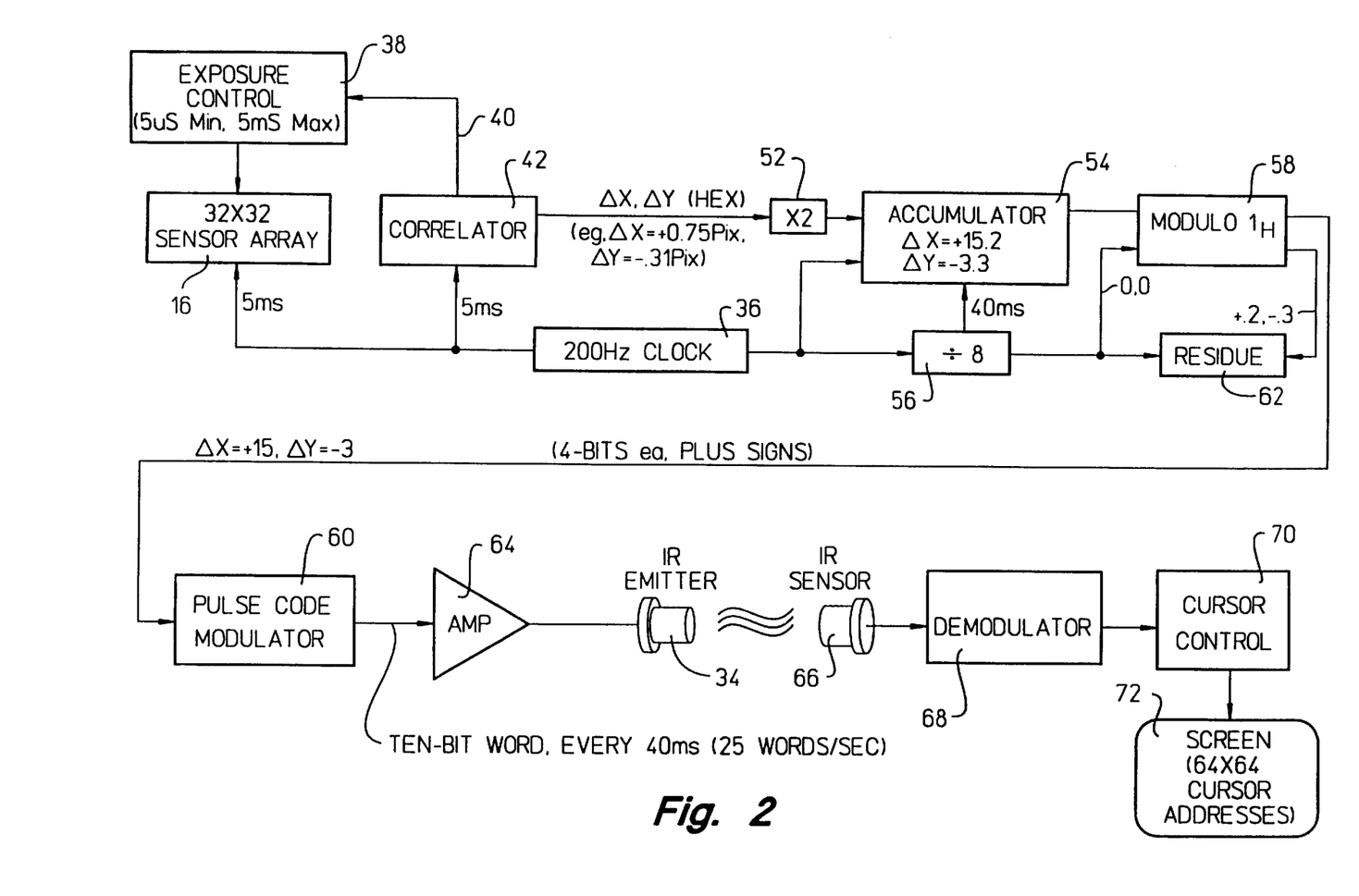
FIG. 2 is a block diagram of components for controlling a screen cursor in accordance with the invention.

Referring now to FIGS. 1 and 2, a control clock 36 determines the timing of operations for the controller device 10. The image-capture rate is at least partially determined by the features that are to be imaged. Where the field of view 28 is a living room of a person engaged in operation of an ITV system, the image capture rate must be sufficiently great to ensure that the image data is sufficiently intelligible to permit correlation between successive images. The circuitry of FIG. 2 includes an exposure control 38 which shows a minimum exposure of 5 $\mu$s and a maximum exposure of 5 ms. Electronically, the "exposure time" is the interval during which charge generated by the individual photosensors is allowed to integrate during the 5 ms period between successive image captures. While the exposure control may be manually adjusted, the preferred embodiment is one in which there is a feedback line 40 from image correlator circuitry 42 to establish automatic gain control. Thus, if the image data is consistently off-scale for performing correlation processing, the exposure control 38 increases the interval for integrating charge by the photosensors.

As previously noted, the field of view 28 is contemplated to be approximately 64°. In a sensor array of 32×32 photosensors, a single pixel will have an approximately 2° field of view (64°/32 pixels). In the preferred embodiment to be described below, correlations are limited to nearest-neighbor pixel cells. This establishes a maximum velocity for movement of the controller device 12. In the preferred embodiment, the maximum velocity should not exceed one pixel length between successive image captures. If a frame of image data is to be acquired at the correlator 42 every 5 ms, the maximum velocity will be 200 pixels per second. Since the field of view of each pixel is 2°, the maximum velocity is 400° per second.

The operation of the correlator 42 will be explained in detail below. Its basic function is to compare the arrangement of pixel values in a first frame of image data to the location of a similar arrangement in a subsequent frame. The sensor array 16 is used to acquire a frame of 32×32 pixel values. The first captured frame is referred to as a reference frame. The first reference frame is captured upon depression of the cursor control key 30 of FIG. 1. A subsequently captured frame of pixel values, referred to as a sample frame, is compared with the reference frame to detect changes in attitude of the controller device 10. A new reference frame is then acquired. The reference frame may be replaced by the sample frame after each correlation. Alternatively, the reference frame may be replaced with a sample frame each time a threshold is reached, such as a time threshold or a threshold based upon movement of the device.

Figure 5:
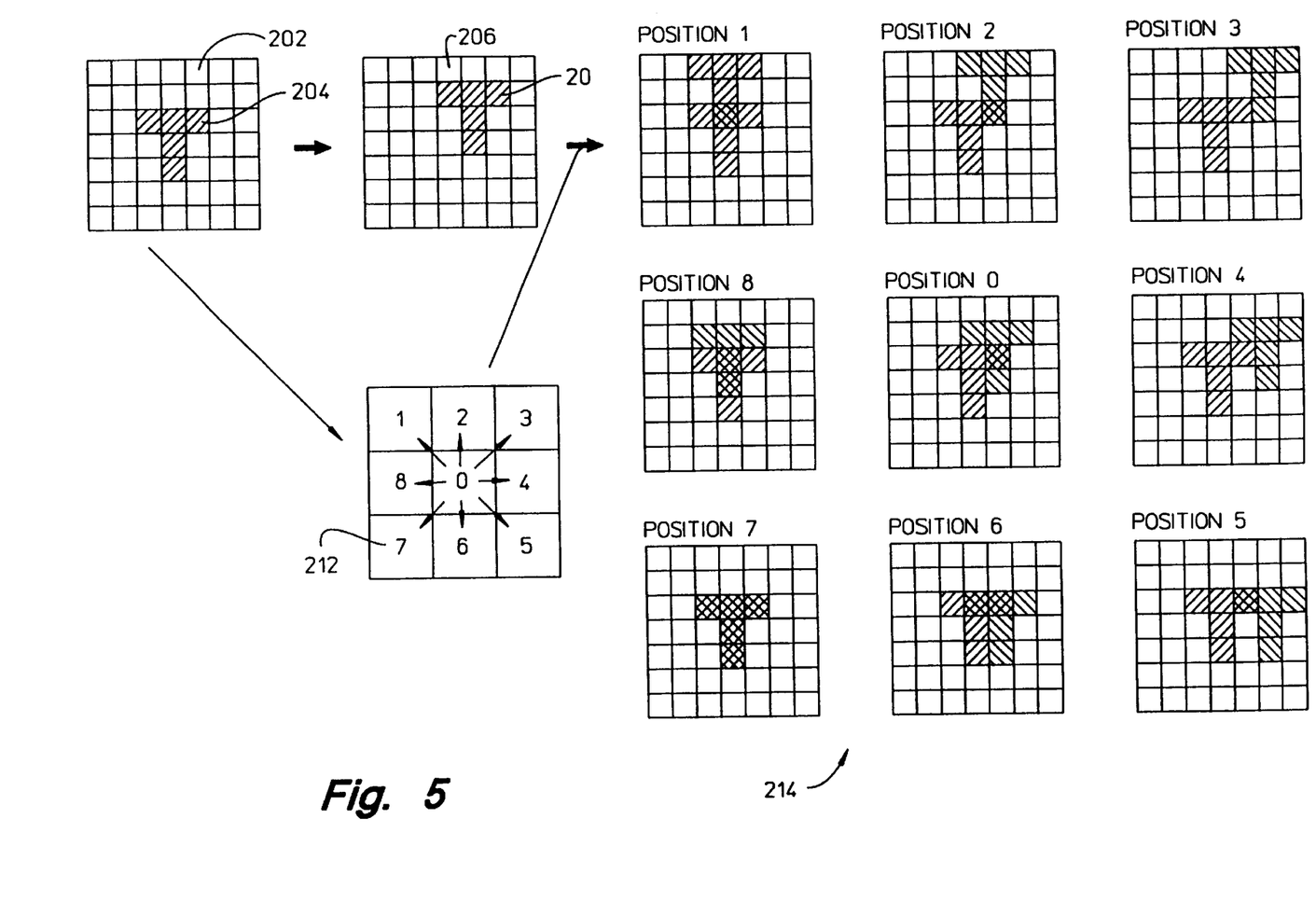
FIG. 5 is a conceptual view of the steps of FIG. 4.

Correlation will be described in detail below. Conceptually, the process may be considered as fixing the two-dimensional reference frame in position and shifting a transparency of the two-dimensional sample frame to various positions atop the reference frame in order to detect alignment of common features of the two frames. This conceptual view is shown in FIG. 5 and is computationally carried out by an array of cells such as the pixel cell shown in FIG. 6.

The correlation processing generates an attitudinal signal indicative of any changes in angular orientation of the controller device 10. In FIG. 2, the correlator 42 is shown as generating a signal in which change along the X axis is +0.75 pixels, while the change along the Y axis is −0.31 pixels. In FIG. 1, positive movement along the X axis may be indicated as a result of angular displacement of the device 10 such that the field of view 28 is moved in the direction of arrow 44, while a negative movement along the X axis is one in which a component of displacement of the field of view 28 is in the direction indicated by arrow 46. Regarding the Y axis, a positive value at the attitudinal signal indicates manipulation of the device 10 to rotate the field of view as shown by arrow 48, while a negative value of ΔY indicates displacement in the direction shown by arrow 50.

The preferred approach for operation of the correlator 42 is one in which nearest-neighbor pixel shifts are executed in order to track changes in attitude of the controller device. This approach will be detailed when referring to FIGS. 4, 5 and 6. However, the attitude tracking alternatively may be carried out using correlations requiring shifts of greater than a single pixel. For either approach, interpolations are computationally performed to identify fractional pixel values. Such image correlating interpolating is well understood by persons skilled in the art.

The output from the correlator 42 is received at a multiplier 52 that increases the sensitivity of the cursor control. In the embodiment of FIG. 2, the multiplier doubles the ΔX and ΔY values from the correlator. The signal is then conducted to an accumulator 54. A divide-by-eight circuit 56 dictates operation of the accumulator 54. Eight samples will be received from the multiplier 52 before the accumulator outputs a sample to a modulo function block 58. The output of the modulo block will be the integer portion of the accumulation of the eight samples from the multiplier 52. As previously noted, the controller device transmits a cursor control signal by means of an IR emitter 34. IR transmission links have limited bandwidth. The use of the accumulator 54 reduces the demands on the communications link.

The exemplary sample from the accumulator 54 in FIG. 2 is shown to be one in which ΔX=+15.2 pixels and ΔY=−3.3 pixels. The modulo block 58 passes only the whole numbers to a pulse code modulator 60. Each of the ΔX and ΔY values is contained within 5 bits, with 4 bits relating to the numerical value and the remaining bit relating to whether the numerical value is positive or negative.

The values output from the modulo block 58 to the modulator 60 are whole number values, while the remainder of the sample from the accumulator 54 is conducted to a residue circuit 62. The residue values are saved at the residue circuit and added to subsequent values from the accumulator.

The remaining arrangement of components is well known in the art. A 10-bit word is output from the pulse code modulator 60 to an amplifier 64 every 40 ms. Thus, the IR transmission from the emitter 34 is only 25 words per second. The IR transmission is received by a sensor 66 of a display system, such as a RIVS. The signal from the IR sensor 66 is decoded at a demodulator 68 and transmitted to a cursor control circuit 70 for manipulating a screen cursor of a video screen 72. Merely for example, the screen may have 64×64 cursor addresses and the screen cursor may move 15×25=375 address states/second. In the example given above in which the field of view 28 of FIG. 1 is 64°, the screen can be traversed in 0.17 second (64/375).

The arrangement and interaction of the components of FIG. 2 permit cursor control based upon tracking of the attitude of the controller device 10 of FIG. 1. The controller encodes the device pitch, yaw and optionally roll by tracking the apparent motion of an image of the environment in which the device resides. It is not necessary to point the controller-in any one direction, other than to establish the IR link between the emitter 34 and the sensor 66. With the possible exception of the correlator 42, the individual components of FIG. 2 are readily understood by persons skilled in the art and need not be explained in detail. However, the preferred embodiment of the correlator 42 will be set forth below. The preferred arrangement of the two-dimensional sensor array 16 and the optics 26 will also be set forth.

Column Transfers of Photosensor Signals

Figure 3:
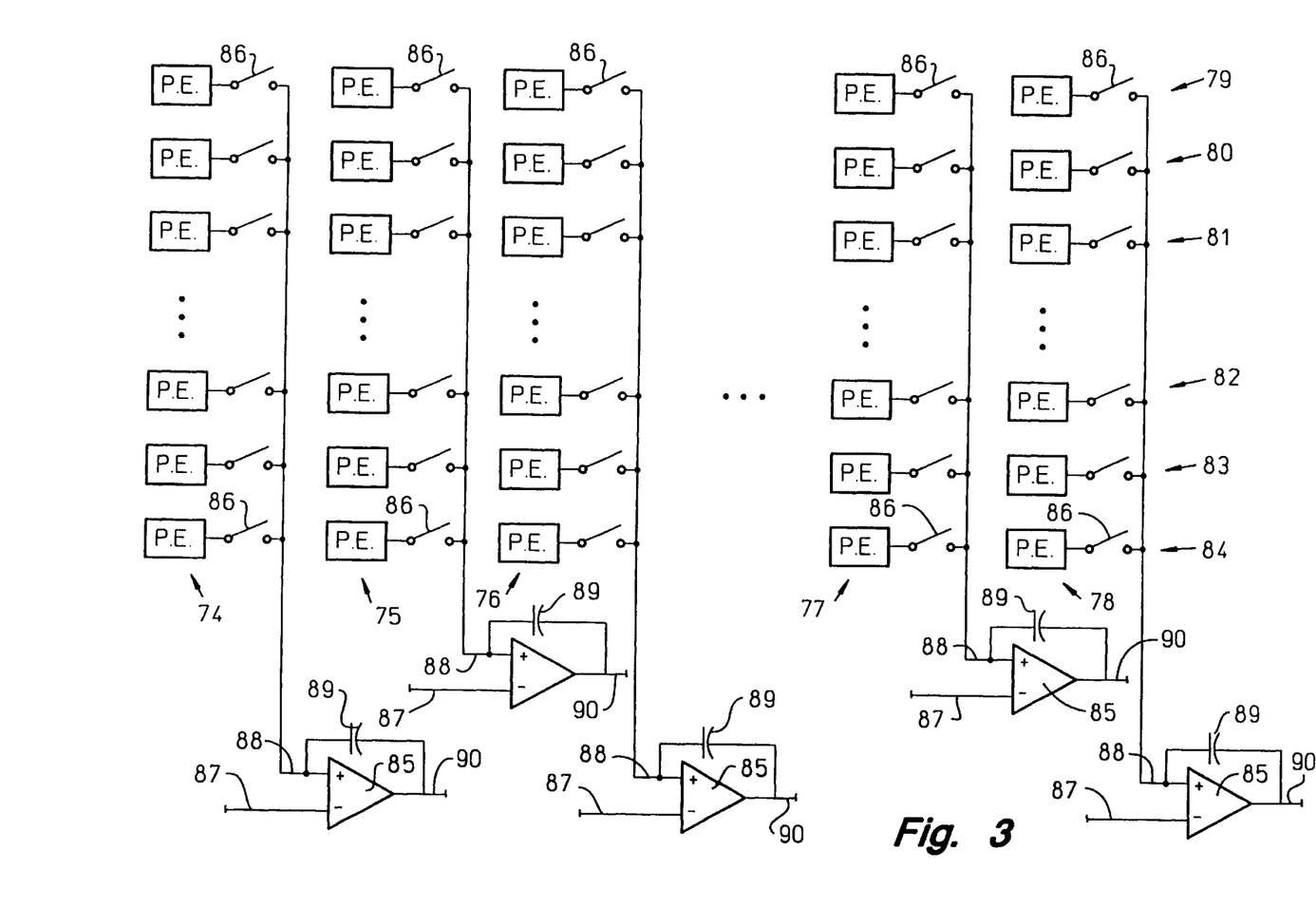
FIG. 3 is a block diagram of an array of photosensors and transfer amplifiers of the correlator of FIG. 2.

As previously noted, the embodiment of FIGS. 1 and 2 includes a sensor array 16 having thirty-two columns and thirty-two rows of photosensors. Referring now to FIG. 3, five columns 74, 75, 76, 77 and 78 of the thirty-two columns of photosensors are shown. Also shown are six of the thirty-two rows 79, 80, 81, 82, 83 and 84. Each column is operatively associated with a separate transfer amplifier 85. A photosensor in a column is connected to the operatively associated transfer amplifier for closing a read switch 86. In the operation of the circuitry of FIG. 3, no two photosensors are connected to the same transfer amplifier simultaneously.

Each transfer amplifier 85 includes an input 87 that is connected to a source of a fixed voltage. A second input 88 is capacitively connected to the output 90 of the transfer amplifier by a transfer capacitor 89.

In the operation of the circuit of FIG. 3, the read switches 86 of the first row 79 of photosensors may be closed, so that each transfer capacitor 89 receives a charge corresponding to the light energy at the associated photosensor in the first row. Thus, the transfer amplifiers 85 and the transfer capacitors 89 function as integrators. The received charge is transferred to subsequent processing circuitry via the output lines 90. Following the readout of the first row, the read switches of the first row are opened and the transfer amplifiers are reset. The read switches of the second row 80 are then closed in order to transfer the signals from the photosensors of the second row. The process is repeated until each row of photosensors is read. By the operation of the transfer amplifiers 85, photosensor signals are transferred in a row-by-row fashion to subsequent circuitry.

Correlation Processing

Figure 4:
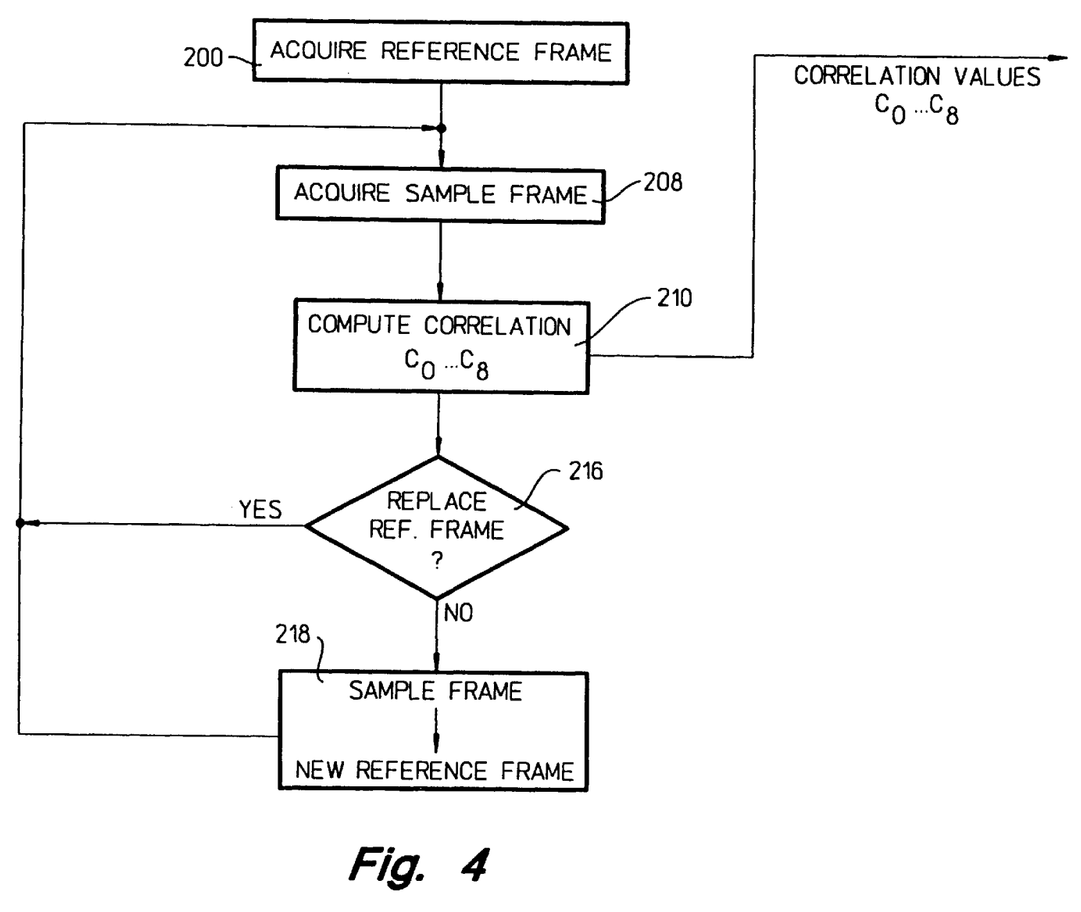
FIG. 4 is an operation view of the steps for correlating successive images in accordance with the invention.

FIG. 4 illustrates steps for carrying out the correlation processing for tracking attitude of a device. In effect, the correlations compare the positions of imaged features in successive frames to provide information related to changes in angular orientation during time intervals between frames. In a first step 200, a reference frame is acquired. As noted above, the capture of the reference frame may be initiated by depression of the cursor control key 30 on the upper surface of the device 10 of FIG. 1. The row-by-row transfer of signals from the photosensors continues until each photosensor in the array 16 has been read. The reference frame is a frame of 1,024 pixel values (32×32=1,024).

While the tracking of the attitude of the controller device 10 is performed computationally, the concepts of the correlation may be described with reference to FIGS. 4 and 5. A reference frame 202 is shown as having an image of a T-shaped feature 204. The image feature may be a window in a room of a person operating an ITV system. At a later time (dt) the sensor array 16 of FIGS. 1–3 is used to acquire a sample frame 206 as shown in FIG. 5. The field of view 28 of the controller device during acquisition of the sample frame largely overlaps the field of view at the time of acquiring the reference frame 202. As a result, the imaged feature 204, e.g. a window, is included within both of the frames. The duration dt and the velocity of the movement of the device preferably are such that the common features 204 will move less than one pixel from the reference frame to the sample frame. The schematic representation of FIG. 5 shows the feature as having shifted upwardly and to the right by one full pixel. The full-pixel shift is assumed only to simplify the representation.

FIG. 4 shows the step 208 of acquiring the sample frame after the step 200 of acquiring the reference frame. A computation step 210 is then executed. The correlation step is a shifting of the arrangement of the pixel values of the sample frame 204 and two nearest-neighbor pixel cells. The shifting is performed sequentially for each of eight nearest-neighbor pixel cells, as represented by member 212 in FIG. 5. Referring to the member 212, step "0" does not include a shift of the pixel values in the sample frame 206, step "1" is a diagonal shift upwardly and to the left, step "2" is an upward shift of the pixel values of the sample frame, etc. Eight shifts of the reference frame represented by member 212 occur one at a time, but all pixel values are shifted uniformly. In this manner, the eight pixel-shifted sample frames can be combined with the reference frame 202 to produce the frame array 214 of position frames. The position frame designated as "Position 0" does not include a shift, so that the result is merely a combination of frames 202 and 206.

Within the frame array 214, "Position 7" has the highest correlation. Based upon the correlation results, the position of the T-shaped feature 204 in the sample frame 206 is determined to be an upward and right-ward shift relative to the position of the same feature in the earlier-acquired reference frame 202. The movement of the feature is a result of a combination of pitch and yaw of the controller device 10 of FIG. 1, with components indicated by the leftward arrow 44 and the downward arrow 50.

While other correlation approaches may be employed, an acceptable approach is a "sum of the squared differences" correlation. For the embodiment of FIGS. 4 and 5, there are nine correlation coefficients ($C_k = C_0, C_1 \ldots C_8$) formed from the nine offsets of 212.

Correlations are used to find the locations of common features 204 of successive frames 202 and 206 in order to track the angular orientation of the controller device 10. Summing or integrating angular displacements from frame-to-frame allows an attitudinal signal to be generated for controlling a screen cursor.

After the correlation step 210 has been executed for the sample frame acquired at step 208, a determination is made at step 216 as to whether to maintain or replace the reference frame. In some embodiments, the reference frame is not replaced. If the same reference frame is to be used for subsequent correlation computation, the process returns to step 208 and a new sample frame is acquired. On the other hand, for applications in which there is a substitution of reference frames, step 218 shows the use of the previously acquired sample frame as a new reference frame prior to returning to step 208 of acquiring a new sample frame.

If the same reference frame is to be used throughout a process of dragging a cursor along a screen, the reference frame can be shifted upon detection that common features have traveled more than one pixel length since the acquisition of the reference frame. Thus, the reference frame is "walked" by detection of pitch, yaw and/or roll of the device. This process provides a high degree of correlation match, but errors that do occur will accumulate if the reference frame is not periodically replaced. Thus, in the preferred embodiment step 218 is included so as to place a restriction on the growth rate of this "random walk" error.

Computation Cell

Figure 6:
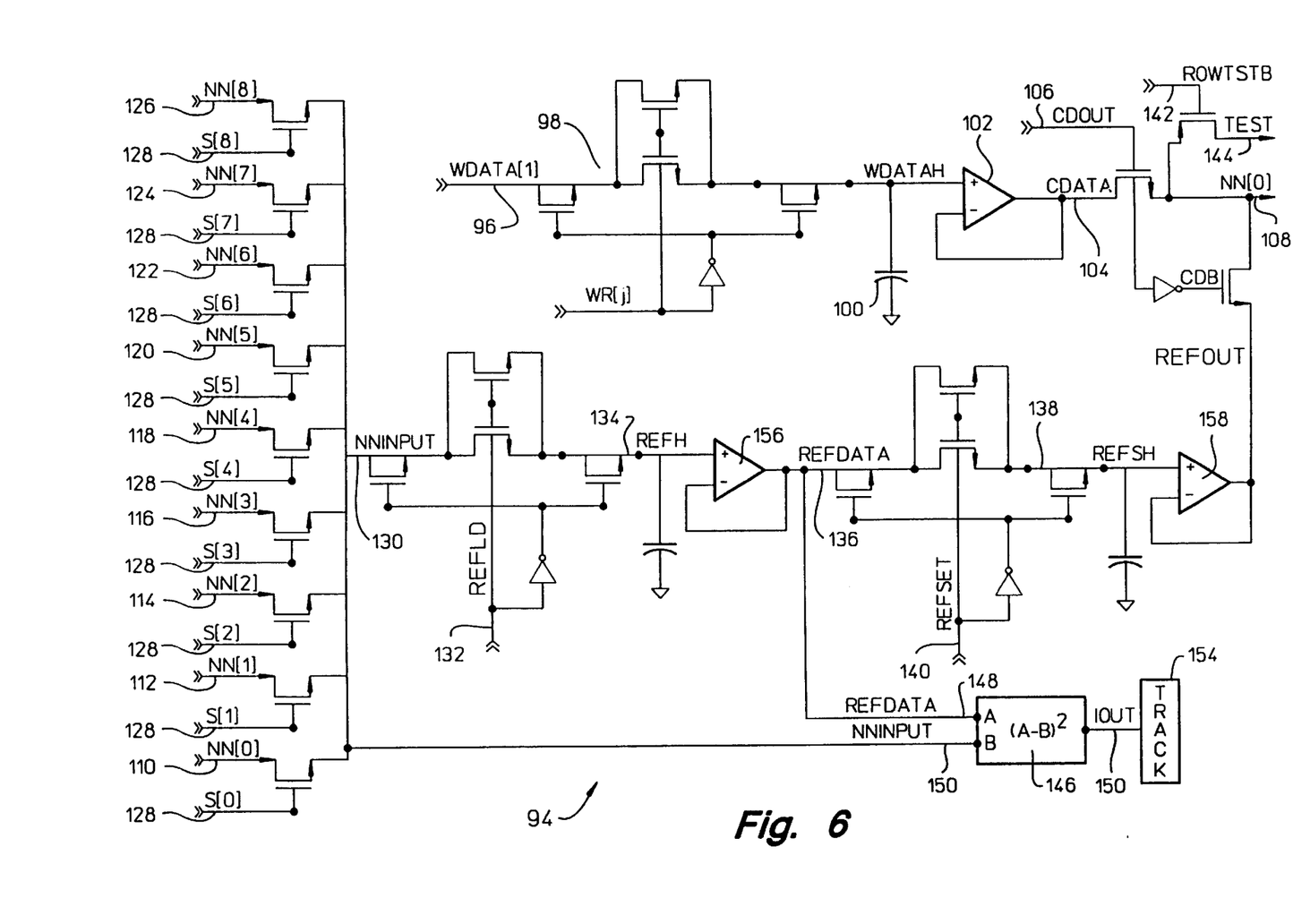
FIG. 6 is an embodiment of a computation cell of an array of cells for carrying out the steps of FIG. 4.

FIG. 6 is a schematic diagram of an individual pixel cell, or computation cell 94, for implementing the nearest-neighbor shifts of member 212 in FIG. 5 and for carrying out the various steps of FIG. 4. However, as will be understood by persons skilled in the art, other circuits may be used to carry out the process steps described and illustrated with reference to FIGS. 4 and 5.

The computation cell 94 of FIG. 6 is one of an array of computation cells. If there is a one-to-one correspondence of computation cells and photosensors, the embodiment of FIGS. 1–3 will have 1,024 computation cells. For the reference frame, the pixel value from the photosensor that corresponds to the particular cell 94 will be stored at the REFDATA node 148, while pixel values of the sample frame will be stored at NN(0) node 108. The shifted sample frames for forming the frame array 214 of FIG. 5 are provided by changing the signal connections to NNINPUT input 150 of a square-of-the-difference circuit 146. The output 150 of the circuit 146 is combined with the outputs of the other 1,023 computation cells to track the attitude of the controller device 10.

Image data WDATA(i) is received from the photosensor that corresponds to the computation cell 94 at line 96, by means of a charge compensate transistor switch 98 under the control of a WR(j) signal. After the WR(j) signal is deasserted, the new data is held at capacitor 100 and is buffered by an amplifier 102. In the entire array of 1,024 computation cells, the array of CDATA nodes 104 is collectively referred to as the "reference frame" or the "sample frame," depending upon the timing of the process. Control input CDOUT 106 selects signal CDATA, comparison data, or selects REFOUT for the nearest-neighbor output node NN(0) 108.

The nearest-neighbor inputs NN(0)–NN(8) 110, 112, 114, 116, 118, 120, 122, 124 and 126 are separately selected by means of switch control signals S(0)–S(8) on lines 128. The NN(0)–NN(8) inputs 110–126 are the outputs of the nearest-neighbor cells according to the data cell map 212 of FIG. 5. The switch control signals are generated by a 4–9 encoder, not shown, that is external to the computational array. The 4-bit input to the encoder is referred to as the nearest-neighbor address and takes on binary values from 0000(0) to 1000(8).

The nearest-neighbor input (NNINPUT) node 130 is sampled by pulsing REFLD 132, thereby storing the NNIN- PUT on node REFH 134. Similarly, REFDATA 136 can be sampled and held on REFSH 138 by pulsing REFSFT 140.

For testing, ROWTSTB 142 can be asserted, allowing the NN(0) signal to propagate to the TEST output 144. The TEST signals from each cell in a row of cells connect to common vertical buses in each column of the computational array and are multiplexed at the bottom of the array and driven off-chip. A standard row decoder along the left edge of the array allows selection of a particular row for test. However, the test feature is not critical to the invention.

Each computation cell 94 has a circuit 146 that determines correlation values. A first input 148 receives the reference data from REFDATA node 136. A second input 150 provides the nearest-neighbor input NNINPUT selected by the appropriate switch control signal at lines 128. The output 152 of the correlation cell is a current. All of the correlation outputs in the computational array are summed together in a single off-chip summing resistor of a tracking circuit 154. The voltage developed across the summing resistor is referred to as the correlation values in FIG. 4.

In the embodiment of FIG. 6, the circuit 146 is based on a squared-difference calculation. The cell 94 may be modified to provide product-based correlations without modifying the basic architecture of the array. Control inputs S(0)–S(8), REFLD, REFSFT and CDOUT are global to the entire array, so that the sample frame is manipulated and shifted uniformly within the computation cell array.

It is important to understand the relationship between the nearest-neighbor map represented by 214 in FIG. 5 for a single cell and for the array as a whole. Location 0 of an image refers to the present location of the image. When referring to the movement of an image from location 0 to location 1, the representation is that the image data in all of the cells of the array are moved to the neighbor cell that is to the left and upward. That is, the movement is relevant to a single cell in the array and is relevant to every cell in the array.

The computational array functionality can be best described in terms of four basic operations: image acquisition, reference image load, correlation computation, and reference image translation. The image acquisition refers to the loading of new image data via the WDATA line 96 of each computation cell 94. In the present implementation, every 50 ms a new frame of pixel values is acquired from the sensor array via the column transfer amplifiers. The process of loading a new reference image is referred to as a "frame transfer." The operations of the computation array described below are coordinated with the frame transfer process by observing and synchronizing with a frame transfer (FTB) signal. The validity of a new sample image is signaled by the falling edge of the FTB signal. The operations described below are only appropriate when FTB is not asserted.

Loading a reference frame of pixel values is required before any image correlations can be calculated. To load the reference frame, all of the voltages at the CDATA nodes 104 in the computational array must be transferred to the REFH nodes 134. This is accomplished by setting CDOUT 106 and S(0) high, and pulsing the REFLD signal on line 132. The reference frame can also be loaded from another nearest-neighbor location by asserting one of the S(1)–S(8) inputs instead of S(0). Amplifier 156 buffers the REFH node 134 from the REFDATA nodes 136. The two-dimensional array of REFDATA nodes 136 within the computational array are collectively known as the reference frame.

After a reference frame has been loaded, the computational array is ready to compute correlations. Correlations between the reference frame of pixel values and the subsequent sample frame are computed by setting the nearest-neighbor address to the desired value and recording the resulting voltage developed across the summing resistor of the attitude tracking circuit 154. When the sensor array has moved a single pixel distance from the location at which the reference frame was acquired, a strong correlation will be detected at one of the nearest-neighbor locations. In FIG. 5, the correlation is detected to be at POSITION 7 in the array 214. Sub-pixel movements can be determined by interpolating in two-dimensional correlation space.

It should be noted that correlations between the reference frame and itself can be computed by setting CDOUT 106 low and pulsing REFSFT 140. This causes the nearest-neighbor inputs to come from the reference frame, rather than from the sample frame.

FIG. 4 referred to the step 218 of replacing the reference frame. However, the same reference frame may be used for multiple pixel movements by allowing the reference to "reach" beyond the nearest-neighbor cells. upon detection that changes in the angular orientation of the device have caused the field of view to shift by more than one pixel distance, the reference frame is shifted to the new location within the computational array. The shift to the new location is dictated by the change in angular orientation of the device. With the reference frame in the new location, nearest-neighbor correlations become correlations between the translated reference frame and a newly acquired sample frame. By translating the pixel values of the reference frame to new locations, inter-cell connectivity is kept to a minimum without compromising the accuracy of the attitude tracking.

The translation of the reference frame is accomplished within the individual computation cells of the computational array. Referring to the computation cell 94 of FIG. 6, a first step is to pulse REFSFT 140 high to sample-and-hold the REFDATA signal 136 at REFSH 138. A third buffer amplifier 158 drives REFOUT 160 with the REFSH signal. CDOUT 106 is driven low, allowing REFOUT 160 to be the output of the computation cell 94 at the NN(0) node 108.

The nearest-neighbor address is then set to select the appropriate S(0)–S(8) input from the switch control signal lines 128. For example, if the T-shaped feature 204 in FIG. 5 is detected to have moved to the right and upwardly from the time at which the reference frame 202 is acquired to the time at which the sample frame 204 is acquired, the pixel values that comprise the reference frame must be shifted from cell-to-cell to the right and upwardly. Since S(0)–S(8) signals switch the address of the cell input NNINPUT 130, S(7) must be driven high to enable movement of the pixel value from location 7 of 212 in FIG. 5 to location 0. This takes place in each computation cell of the computational array. After REFOUT 160 has settled on the NNINPUT 130 of the appropriate neighbor cell, REFLD 132 is pulsed high to sample-and-hold the translated reference values at REFH 134. After this operation has occurred in each of the computation cells of the array, the computational array is again ready to compute correlations.

Sensor/optics Arrangement

Another aspect of the invention is the arrangement for significantly reducing the adverse effects of what is known in lens design as "curvilinear distortions." These distortions are also referred to as pincushion, barrel, and perspective distortions. The distortions compress rectilinear detail at the outer edges of a field of view.

The curvilinear distortions are particularly pronounced in simple lenses with wide fields of view. Such a lens may be used as the lens 26 in FIG. 1. The distortions are problematic, since they will cause the apparent shape of a feature to change as the feature drifts across the field of view.

A change in the apparent shape of a feature will adversely affect the correlation process described with reference to FIGS. 4–6.

Figure 7:
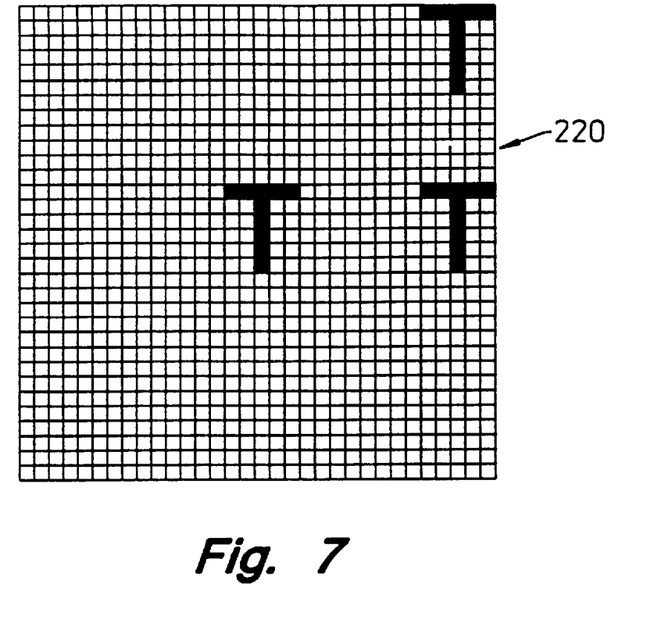
FIGS. 7–11 illustrate arrays of photosensors and computation cells for demonstrating and then reducing curvilinear distortions.

FIG. 7 shows images of a T-shaped feature, imaged with distortion-free optics onto a 32×32 pixel array 220. With such optics, the shape of the feature does not change with travel across the array, allowing high quality correlations and accurate tracking of pitch and yaw.

Figure 8:
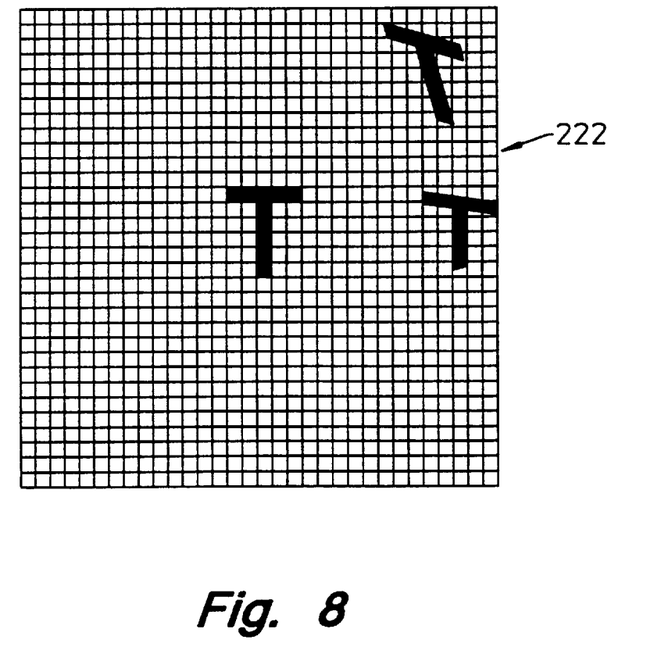
Figure 9:
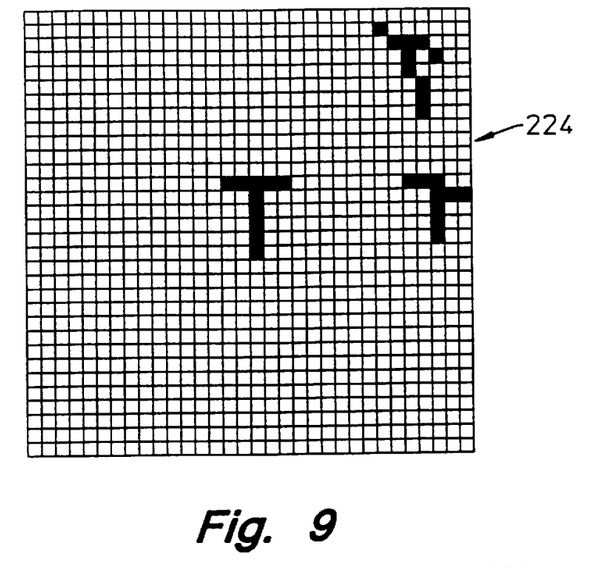

On the other hand, FIG. 8 illustrates the same feature imaged onto a pixel array 222 using a simple lens. It can be seen that the distortion increases as the feature is moved further from the optical axis of the lens. FIG. 9 shows in a stylized manner the way in which the feature is interpreted by the computational array for performing the correlation processing of FIG. 5. Each pixel in the array 224 of FIG. 9 represents a computational cell 94, such as the one shown in FIG. 6. It is evident that the feature is "viewed" differently as it changes position within the computational array. This reduces the quality of the correlation, and the accuracy of the tracking of device attitude. Equally undesirable, the apparent motion of the feature changes with position, further degrading the accuracy of attitude tracking. For example, a strong off-axis moving detail will be measured as moving less than if the identical move were made on-axis. The result is a degradation of the attitude-tracking accuracy of the system. The adverse effects may be made smaller by not carrying the reference image across as many pixels, but this option of more frequently "zeroing" the reference frame increases the number of incremental errors, thereby adding its own contribution to tracking inaccuracy.

Figures 10, 11:
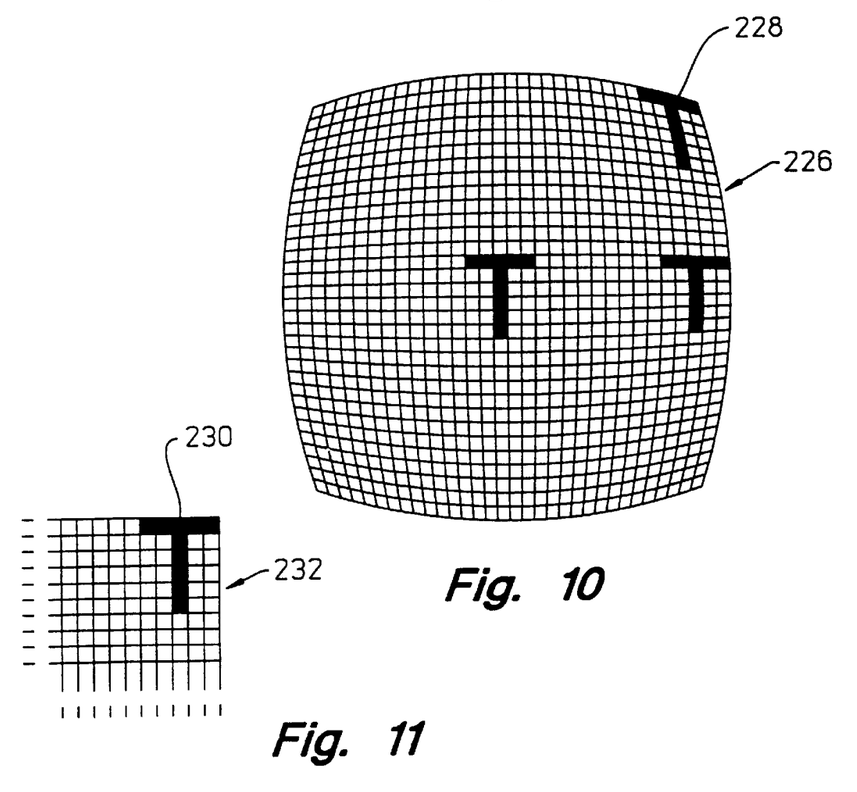

FIG. 10 illustrates a two-dimensional array 226 of photosensors configured to match the distortion of the lens. That is, the characteristics of the lens system with regard to introducing curvilinear distortions are determined and the array is configured to compensate for the distortions. Projected onto the curvilinear array of FIG. 10 is the T-shaped feature in three different positions. It can be noted that although the images of the feature are still distorted, the distortion causes the images to fit within the pixels. Thus, each feature will be viewed as being rectilinear at the computation array level. That is, the corner image 228 will be distorted at the sensor level, as shown in FIG. 10, but the corner image 230 will be "viewed" as being an undistorted "T" at the computational array 232 of FIG. 11.

The method of ascertaining the curvilinear geometry of the photosensor array elements may now be described. Conceptually, it consists of starting with an enlarged object plot of a 32×32 array of rectilinear (not curvilinear) cells, perhaps a foot square. The lens of choice is next used to produce an image of this array. This small and curvilinear image captures the distortions of the lens, and represents a reasonable approximation to an ideal array geometry.

This process produces accurate imaging with lenses of any field of view, and has many applications such as in positional navigation. However, in the present pointing device, it is a goal to transduce angles and not distances. For lenses of narrow fields of view, angles tend to become increasingly compressed as one moves further off of the optical axis.

This undesirable angular compression is avoided by changing the design process such that a segment of a sphere is substituted for the aforementioned flat array. The center of the spherical segment is overlaid approximately with the nodal point of the lens. The segment is lined at intervals of perhaps 2° in latitude and longitude. Each cell formed on the spherical segment, once imaged and reduced, is taken to be the outline of an array cell.

In practice, this method of generating the geometry of the curvilinear array is best accomplished using computer ray tracing. Many commercial optical design programs are available and familiar to those skilled in the art.

One advantage of the curvilinear array is that it provides more accurate autocorrelations, regardless of how far the images move from the axis of the sensor array. A second benefit is that distances are true and not compressed, so that attitude tracking is accurate over larger pixel moves without regard to where the move is imaged on the sensor array. Each benefit of the curvilinear array in itself contributes to more accurate tracking. Since the correlation is stronger and less noisy, the accuracy of measuring the end point of each move segment is higher. Moreover, since the image can be tracked in longer segments, the frequency of zeroing the reference frame is reduced, so that the cumulative re-zeroing error becomes less. Finally, because the curvilinear array does not compress off-axis moves, the accuracy of distance measurement is greater.

What is claimed is:

1. An arrangement of a sensor and optics comprising:

an array of photosensors; and a lens system for providing a focus for imaging by said array, said lens system having a characteristic of Introducing curvilinear distortion of an image to said array;

said array having a shape to achieve compensation of said curvilinear distortion, including having arcuate edges to establish said compensation;

wherein said photosensors are disposed in a plurality of columns and a plurality of rows and wherein said photosensors combine to define an optical axis for said array, adjacent columns being spaced apart by an arcuate boundary, with curvatures of said arcuate boundaries increasing with departure from said optical axis.

2. The arrangement of claim 1 wherein adjacent rows are paced apart by second arcuate boundaries, with curvature of said second arcuate boundaries increasing with departure from said optical axis.

3. An arrangement of a sensor and optics comprising:

a two-dimensional array of photosensors; and a lens system for providing a focus for imaging by said array, said lens system having a characteristic of optically introducing curvilinear distortion of an Image to said array;

said array having a curvilinear shape to achieve compensation of said curvilinear distortion, including having a plurality of arcuate outer edges to establish said compensation, said photosensors being varied dimensionally to define said curvilinear shape, said curvilinear shape being aligned relative to said curvilinear distortion to introduce a physical distortion that offsets said optically introduced curvilinear distortion;

wherein said photosensors are disposed in a plurality of columns and a plurality of rows and wherein said photosensors combine to define an optical axis for said array, adjacent columns being spaced apart by an arcuate boundary, with curvatures of said arcuate boundaries increasing with departure from said optical axis.

4. The arrangement of claim 3 wherein adjacent rows are spaced apart by second arcuate boundaries, with curvature of said second arcuate boundaries increasing with departure from said optical axis.

* * * * *